United States Patent [19]

Yuge et al.

[11] Patent Number: 5,182,091
[45] Date of Patent: Jan. 26, 1993

[54] METHOD AND APPARATUS FOR PURIFYING SILICON

[75] Inventors: Noriyoshi Yuge; Hiroyuki Baba; Fukuo Aratani, all of Chiba, Japan

[73] Assignee: Kawasaki Steel Corporation, Kobe, Japan

[21] Appl. No.: 706,990

[22] Filed: May 29, 1991

[30] Foreign Application Priority Data

May 30, 1990 [JP] Japan .................. 2-138266
May 30, 1990 [JP] Japan .................. 2-138268
May 9, 1991 [JP] Japan .................. 3-104342

[51] Int. Cl.$^5$ ............................ C01B 33/02
[52] U.S. Cl. .......................... 423/348; 204/164
[58] Field of Search .......... 204/164, 907; 423/278, 423/279, 282, 349, 350, 348

[56] References Cited

U.S. PATENT DOCUMENTS

| | | | |
|---|---|---|---|
| 4,377,564 | 3/1983 | Dahlberg | 423/350 |
| 4,379,777 | 4/1983 | Boulus | 423/348 |
| 4,680,096 | 7/1987 | Dosaj et al. | 204/164 |

FOREIGN PATENT DOCUMENTS

| | | | |
|---|---|---|---|
| 0096717 | 8/1981 | Japan | 423/349 |
| 0149815 | 9/1982 | Japan | 423/349 |
| 62-292613 | 12/1987 | Japan | |
| 63-218506 | 9/1988 | Japan | |

Primary Examiner—Olik Chaudhuri
Assistant Examiner—Ken Horton
Attorney, Agent, or Firm—Dvorak and Traub

[57] ABSTRACT

Disclosed herein are a method and apparatus for purifying silicon, which are suitable for economical and mass production of high-purity silicon for solar cells from regular-grade silicon containing boron and carbon in large quantities. The method comprises directing a plasma jet stream of an inert gas toward the surface of molten silicon held in a container lined with silica or a silica-based refractory. For improved purification, the inert gas as the plasma gas is mixed with 0.1-10 vol % steam and/or less than 1 g of silica powder per liter of the inert gas at normal state. Alternatively, the container may have a bottom opening and is provided with an electrode having a cooling means underneath the bottom of the container, with the electrode and the cathode of the plasma torch connected to a power source for plasma generation, so that the plasma jet and electron beam are directed toward the surface of molten silicon.

3 Claims, 4 Drawing Sheets

METHOD AND APPARATUS FOR PURIFYING SILICON

BACKGROUND OF THE INVENTION

1. Field of the Invention

The present invention relates to a method and apparatus for purifying silicon to such an extent as to be suitable for solar cells.

2. Description of the Prior Art

High-purity silicon for solar cells should have a resistivity greater than, say, 0.1 Ω.cm. Therefore, it is necessary that the content of impurities in such high-purity silicon be of the order of ppm. Much has been studied to achieve this goal; however, boron and carbon still remain difficult to remove.

One known method for removing boron is by melting silicon under a high-temperature plasma generated by radio-frequency excitation. (See Japanese Patent Laid-open No. 218506/1988.) According to the disclosure, this method consists of a first step of treating silicon with a (mixed) gas composed of 1-100% hydrogen and 99-0% argon, and a second step of treating silicon with a plasma generated in a mixed gas composed of 0.005-0.05% oxygen and 1-99.995% hydrogen. This method has some disadvantages, including:

(a) Wastefulness resulting from the use of a thermally inefficient plasma to both melt and purify silicon.
(b) Low productivity inherent in a plasma which merely melts a comparatively small limited are of silicon (which does not warrant the mass production of solar cells).
(c) Restrictions on increasing the oxygen concentration in plasma gas which are inevitable to reduce the loss (by scattering and evaporation) of silicon that occurs due to local excessive heating during purification.

As to the removal of carbon, there is disclosed in Japanese Patent Laid-open No. 292613/1987 a method which consists of blowing argon gas (under reduced pressure) over molten silicon in a silica crucible in such a manner as to stir the molten silicon. This method is slow in decarburization and poor in productivity.

SUMMARY OF THE INVENTION

The present invention was completed to address the above-mentioned problems. Accordingly, it is an object of the present invention to provide a method and apparatus for purifying silicon. In other words, it is an object of the present invention to provide an economical, efficient method for purifying metallurgical-grade silicon (which contains boron and carbon in a larger quantity level than required for solar cells) to such an extent as to be suitable for solar cells and also to provide an apparatus necessary to practice the method.

DESCRIPTION OF THE PREFERRED EMBODIMENTS

Figure 1:
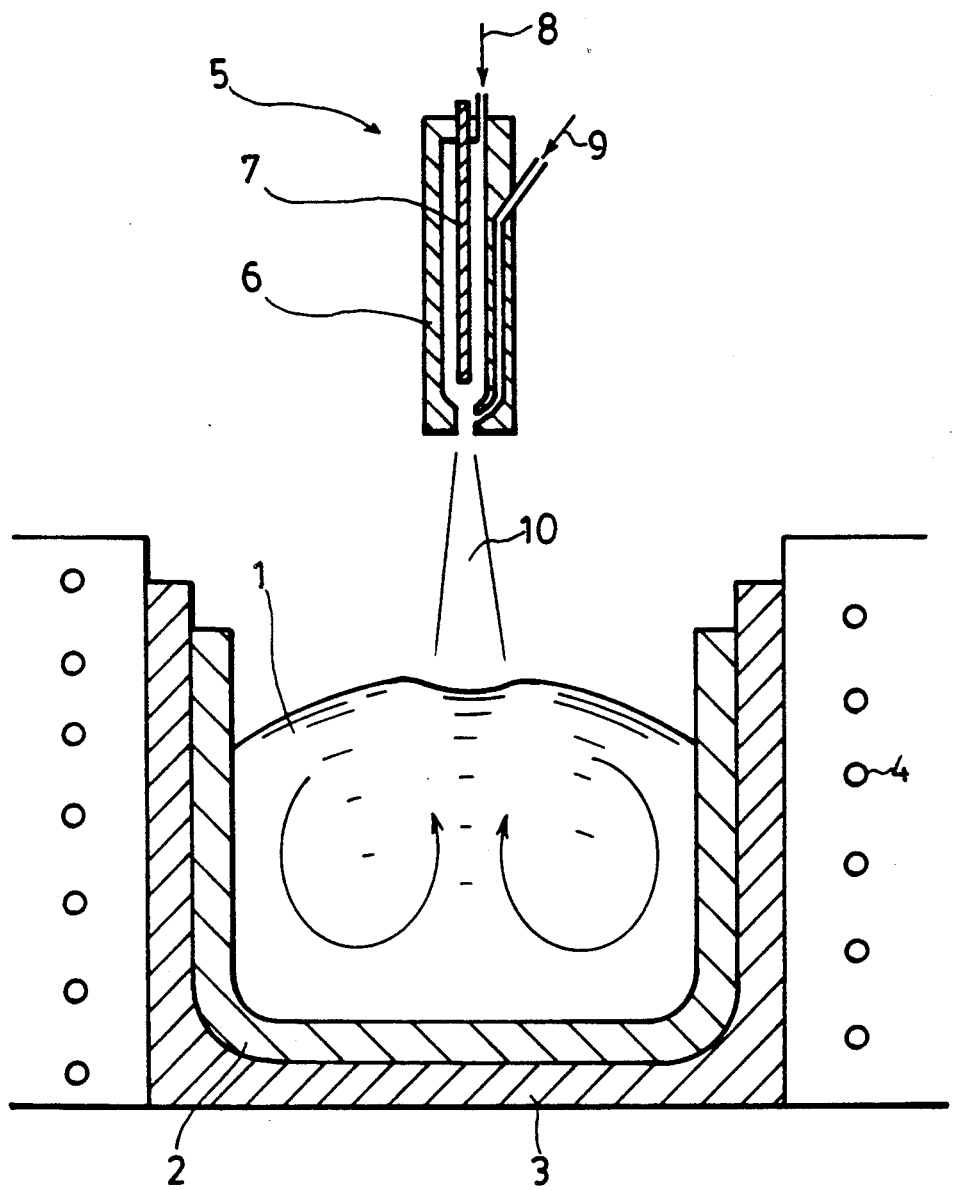
FIG. 1 is a longitudinal sectional view showing an apparatus for purifying silicon which pertains to the first embodiment.

According to the method of the present invention, silicon is purified by directing an arc-induced high-temperature, high-velocity plasma jet toward the surface of molten silicon heated by induction or resistance in a container lined with silica or a silica-based refractory, thereby causing the plasma jet to stir the molten silicon and to produce a high-temperature spot where boron and carbon escape from the molten silicon. It is desirable that the inert gas (such as argon or helium) as the plasma gas be mixed with 0.1-10 vol% steam and/or less than 1 g of silica powder per liter of the inert gas at normal state (0° C. and 1 atm). It is also desirable that a voltage for plasma generation be applied across the molten silicon and the plasma torch which emits the plasma jet.

According to the present invention, the apparatus for silicon purification comprises a container lined with silica or a silica-based refractory in which to hold molten silicon, a heating means to heat the molten silicon from outside the container, and a plasma torch which emits a plasma jet toward the surface of the molten silicon held in the container. It is desirable that a voltage for plasma generation be applied across the molten silicon and the plasma torch. It is also desirable that the container have a bottom opening and the container be provided with a water- or gas-cooled electrode underneath the bottom opening so that the melt is solidified in the bottom opening for preventing leakage of silicon from the container, said electrode being connected to the cathode of the plasma torch through a power source.

An advantage of the method of the present invention is that the molten silicon in the container is easily stirred by the plasma jet and hence amply supplied with oxygen from the container wall. The high oxygen content in the silicon bath is favorable to the removal of carbon and boron.

According to the method of the present invention, the plasma is generated by using a mixed gas composed of an inert gas (such as argon and helium) and hydrogen. Purification is accomplished by the removal of boron and carbon in the form of oxides. Oxygen to form oxides is furnished from the container wall of silica or silica-based refractory as the molten silicon is stirred. Silica constituting the container wall or crucible lining prevents the entrance of impurities into silicon, furnishes oxygen, and functions as the reaction site for carbon removal. Therefore, silica is indispensable for carbon removal. For more rapid carbon removal, it is desirable to add an oxidizing gas (such as steam and oxygen, preferably steam) and/or silica powder to the plasma gas at the exit of the plasma torch. The amount of steam to be added is 0.1-10 vol%, and the amount of silica powder to be added is less than 1 g per liter of the inert gas at the normal state. Oxygen in the plasma jet may form solid silica on the surface of molten silicon, if its content is high. This solid silica is easily melted by adding a small amount of flux (such as CaO and CaF$_2$) to ensure the smooth stirring of the molten silicon by the plasma jet. In addition, the inert gas (such as argon and helium) as the plasma gas may be mixed with hydrogen to increase the plasma jet power, thereby producing the same effect as in the case where the molten silicon is stirred more vigorously.

Although the above-mentioned method employs a plasma torch which generates an arc therein, it is possible to make modification by applying a voltage across the plasma torch and the molten silicon. This modification is accomplished by making an opening in the bottom of the container and providing the bottom of the container with an electrode. The applied voltage generates an electron beam which flows from the cathode of the plasma torch to the molten silicon. The consequence of arcing outside the plasma torch is energy saving resulting from less heat generation in the plasma torch. Moreover, the electron beam in conjunction with the plasma jet impinge upon the surface of the molten silicon, not only stirring the molten silicon but also permitting an electric current to flow through the molten silicon. This electric current intensifies the stirring. As the plasma jet and electron beam impinge upon the surface of molten silicon, they form a high-temperature spot where reactions take place rapidly for the removal of boron and carbon from silicon.

Reactions for the removal of boron and carbon proceed at a sufficiently high speed even under atmospheric pressure as mentioned above. For higher productivity, it is desirable to carry out the procedure under reduced pressure. The preferred pressure ranges from $10^{-3}$ to 1 atm to avoid the excess loss of silicon in the form of monoxide.

The stirring of molten silicon prevents the surface layer of molten silicon from being excessively heated by the plasma jet (and electron beam) which impinge upon the surface of molten silicon. In other words, the violent heating by the plasma jet (and electron beam) is confined to a narrow area on the surface of molten silicon. This minimizes the loss of silicon by evaporation. This effect is enhanced by applying an electric current to the molten silicon, thereby promoting its stirring.

It was found by small scale experiments that the adequate stirring of molten silicon reduces the loss of silicon below 10% during the purification process even though the amount of steam added to the plasma gas is increased to 10 vol%. Thus the stirring of molten silicon is essential for the present invention. A better result is obtained when induction heating is applied to the molten silicon.

The purification method of the present invention can be applied to metallurgical-grade silicon; however, for the effective removal of carbon, it is desirable to previously remove silicon carbide from it by filtration. The purified silicon may be further purified easily by zone refining or directional solidification to a higher purity required for solar cells.

As mentioned above, the present invention is designed to purify silicon by directing a plasma jet toward the surface of induction-heated molten silicon. Using a plasma jet in this manner for purification prevents the entrance of impurities into silicon from the plasma torch and minimizes energy loss.

EXAMPLES

The invention will be explained in more detail with reference to the following examples. An apparatus (as the first embodiment) pertaining to the present invention is shown in FIG. 1 which is a longitudinal sectional view. There are shown molten silicon 1, a quartz crucible 2, a heat insulating lining 3, and an induction heating coil 4. Above the molten silicon is shown a plasma torch 5 having an anode 6 and a cathode 7 which excites an inert gas 8 to generate a plasma jet 10. The plasma jet 10 impinges upon the surface of the molten silicon 1. The inert gas may be mixed with steam, oxygen, and silica powder 9 individually or in combination according to need.

The apparatus shown in FIG. 1 is used in the following manner to practice the method of the present invention. First, silicon is melted by the ordinary heating means such as induction heating. Then, a plasma jet 10 is directed toward the surface of the molten silicon 1 whereby the molten silicon is stirred. A quartz crucible should preferably be used for the molten silicon to avoid contamination. A quartz crucible may be replaced by a crucible formed by stamping silica powder.

Figure 2:
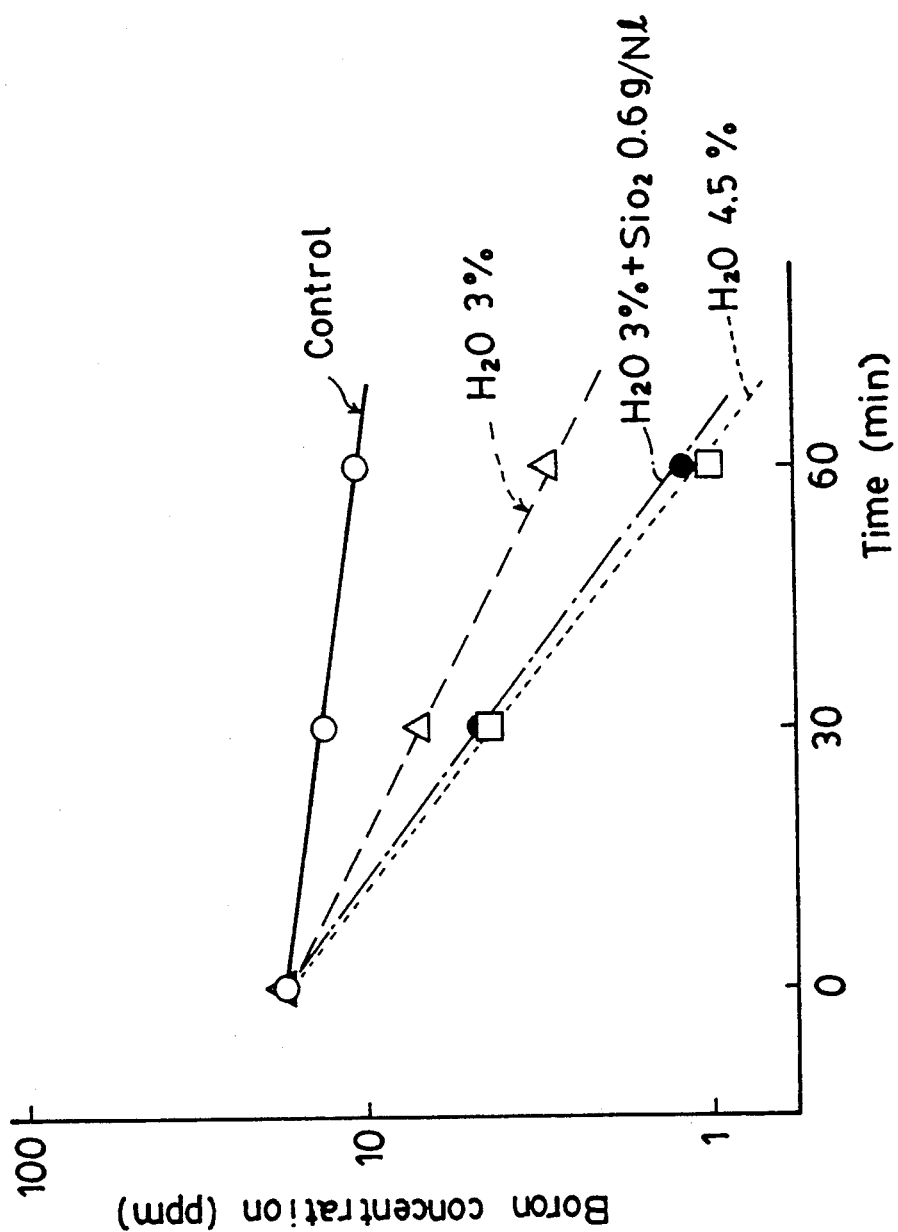
FIG. 2 is a graph showing how the concentration of boron in silicon changes with time when silicon is purified using the apparatus as shown in FIG. 1.

To evaluate the effectiveness of the method of the present invention, silicon purification was carried out in the following manner using the above-mentioned apparatus. Metallurgical-grade silicon (1 kg) was melted in a quartz crucible 2 (115 mm in inside diameter and 70 mm high) by induction heating. Toward the surface of the molten silicon was directed a plasma jet 10 generated by a 30-kW arc plasma torch 5 placed 50 mm above the melt. It was found tat the boron concentration in the molten silicon 1 changed with time as shown in FIG. 2. The rate of change in the boron concentration varies depending on whether the plasma gas is mixed with steam or silica powder.

The reaction for boron removal was observed to be first order with respect to boron concentration as shown by the equation (1) below.

$$-d[B]/dt = k[B] + C \qquad (1)$$

where

[B] : concentration of boron in silicon (ppmw)

t : time (min)

k : rate coefficient

C : constant

According to the equation (1), the greater the value of k, the more effectively boron is removed. The results of experiments carried out under varied conditions indicate that the value of k varies depending on the amount of steam, oxygen, and silica powder added to the plasma gas. It was found that the amount of steam should be 0.1–10 vol% and the amount of silica powder should be less than 1 g per liter of the plasma gas at the normal state, if boron is to be removed at an adequate rate. This is graphically shown in FIG. 3. It is noted that the reaction coefficient increases as the amount of steam in the plasma gas increases from 0.1 vol% to 10 vol%. With an amount less than 0.1 vol%, the reaction coefficient is too low for the reaction to be practical. With an amount in excess of 10 vol%, a film of silicon oxide is formed on that part of the surface of molten silicon upon which the plasma jet impinges, and this film hinders the purification process.

To compare the present invention with the prior art technology, experiments were carried out to purify 50 g of silicon according to the method (disclosed in Japanese Patent Laid-open No. 218506/1988) in which argon containing 0.005–0.05% oxygen and 1–99.995% hydrogen is employed and silicon is partially melted only by the heat of plasma jet of the gas, using the same arc plasma apparatus, but without any container, as used in the method of the present invention. According to the disclosure, the upper limit of oxygen content, which is 0.05%, is critical. In fact, when more than 0.05% oxygen was added to the plasma gas, an oxide film formed on the surface of molten silicon, retarding the removal of boron, and the loss of silicon was as high as 40%.

In contrast to this prior art technology, the method of the present invention makes it possible to add large amount of oxidizing agent and to purify a large a amount of silicon by a single step in a short time. It is assumed that the plasma jet impinging upon the surface of molten silicon (converting under the influence of induction heating) locally heats the melt to such a high temperature that the oxide film thereon disappears by melting. Moreover, it is considered that this effect is enhanced by the addition of steam and silica powder as the oxidizing agent. The method of the present invention is suitable for the mass production of purified silicon because of its adaptability to using a larger amount of oxidizing agent than the conventional technology.

Figure 3:
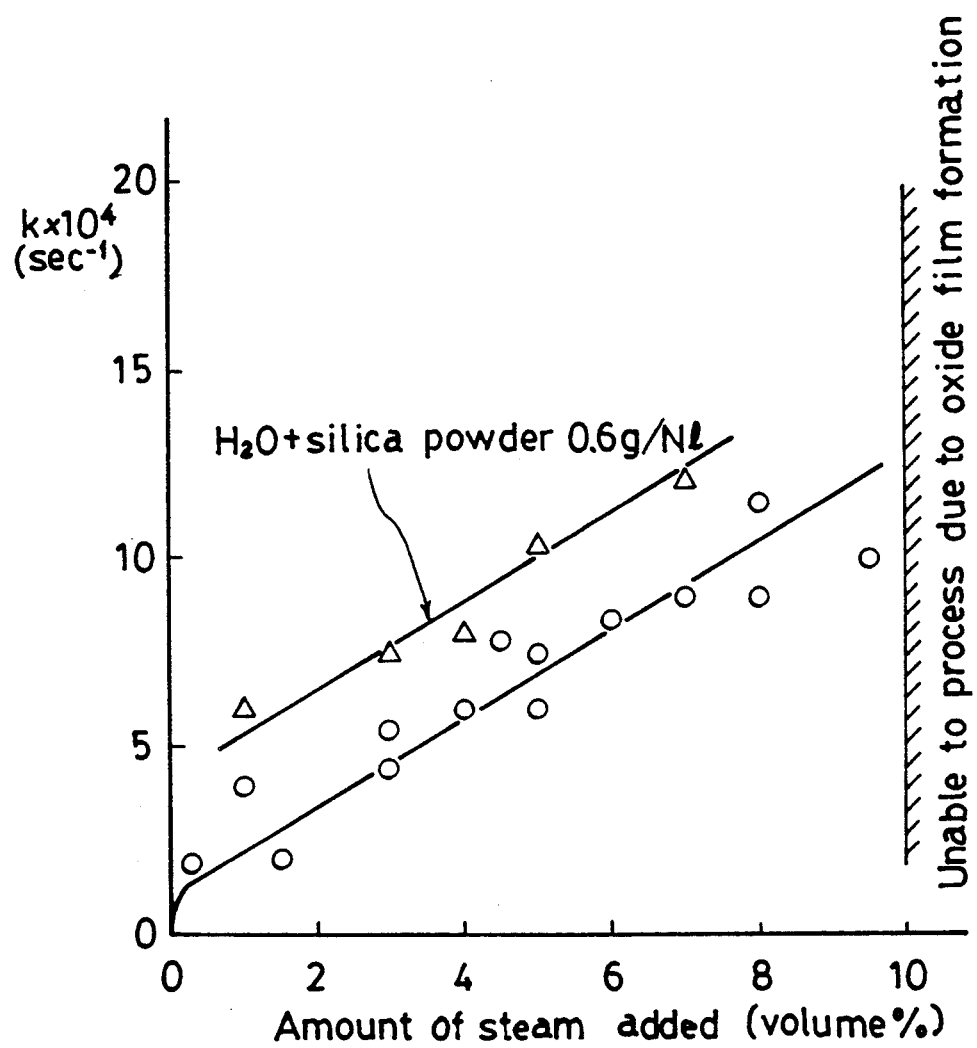
FIG. 3 is a graph showing how the rate coefficient κ varies depending on the modification of the plasma gas.

According to the method of the present invention, silica powder can be used as the oxidizing agent as mentioned above. In practical operation, however, it produced a better effect as shown in FIG. 3 when used in combination with steam. In this case, the adequate amount of silica powder (having an average particle diameter at 10 μm) is less than 1 g per liter of plasma gas at the normal state. With an amount in excess of 1 g per normal liter, silica powder covers the surface of molten silicon, hindering the operation.

The same effect as mentioned above was achieved when silica powder was replaced by any one or more of CaO, $CaF_2$, and $CaCl_2$. It is assumed that the substitute melts to absorb silicon oxide formed by the reaction.

EXAMPLE 1

Silicon purification (removal of boron and carbon) was carried out using the same apparatus as shown in FIG. 1, except that the quartz crucible 2 was replaced by a silica crucible (80 mm in diameter). Raw silicon (500 g) was placed in the silica crucible and melted at 1430° C. under atmospheric pressure by induction heating. Toward the surface of the molten silicon was directed for 30 minutes the plasma jet 10 generated by the 30-kW arc plasma torch 5 fed with argon as the plasma gas at a rate of 15 liters/min. The plasma torch was placed 50 mm above the molten silicon. The results are shown in Table 1, No. 1.

EXAMPLES 2 and 3

Silicon purification (removal of boron and carbon) was carried out using the apparatus as shown in FIG. 1. Raw silicon (1 kg) was placed in the quartz crucible (115 mm in inside diameter and 70 mm high) and melted by induction heating. Toward the surface of the molten silicon was directed for 60 minutes the plasma jet 10 generated by the 30-kW arc plasma torch 5 fed with the plasma gas containing 3 vol% or 4.5 vol% steam. The plasma torch was placed 50 mm above the molten silicon. The results are shown in Table 1, Nos. 2 and 3.

EXAMPLE 4

The same procedure as in Examples 2 and 3 was repeated, except that the plasma gas was mixed with 3 vol% steam and silica powder (0.6 g per liter of plasma gas at the normal state). The results are shown in Table 1, No. 4.

EXAMPLES 5 and 6

The same procedure as in Example 1 was repeated, except that the plasma gas was mixed with 9 vol% steam (in Example 5) or 0.1 vol% oxygen (in Example 6). The results are shown in Table 1, Nos. 5 and 6. (Incidentally, with an amount of oxygen changed to 0.15 vol%, it was impossible to carry out satisfactory purification due to the formation of solid silica on the surface of molten silicon.)

EXAMPLE 7

The same procedure as in Examples 1, 5, and 6 was repeated, except that the plasma gas was mixed with 3 vol% steam and the process was carried out under reduced pressure ($10^{-2}$ atm). The process lasted for 30 minutes. The results are shown in Table 1, No. 7.

EXAMPLE 8

The same procedure as in Example 1 was repeated, except that the plasma gas was mixed with 0.1 vol% oxygen (under the atmospheric pressure) and a flux (composed of 20 g each of $CaF_2$ and CaO) was added. The results are shown in Table 1, No. 8.

COMPARATIVE EXAMPLE

Silicon purification was performed as follows according to the conventional method. Raw silicon (500 g) was melted in a silica crucible (80 mm in diameter) and then solidified. The solidified silicon was melted again and purified for 30 minutes by the aid of plasma. The results are shown in Table 1, No. 9. It is noted that the conventional method is inferior to the method of the present invention in purification efficiency and yield. In this experiment the amount of oxygen was as low as 0.05 vol%. With an amount of oxygen higher than this, it was impossible to carry out satisfactory purification.

EXAMPLE 9

Figure 4:
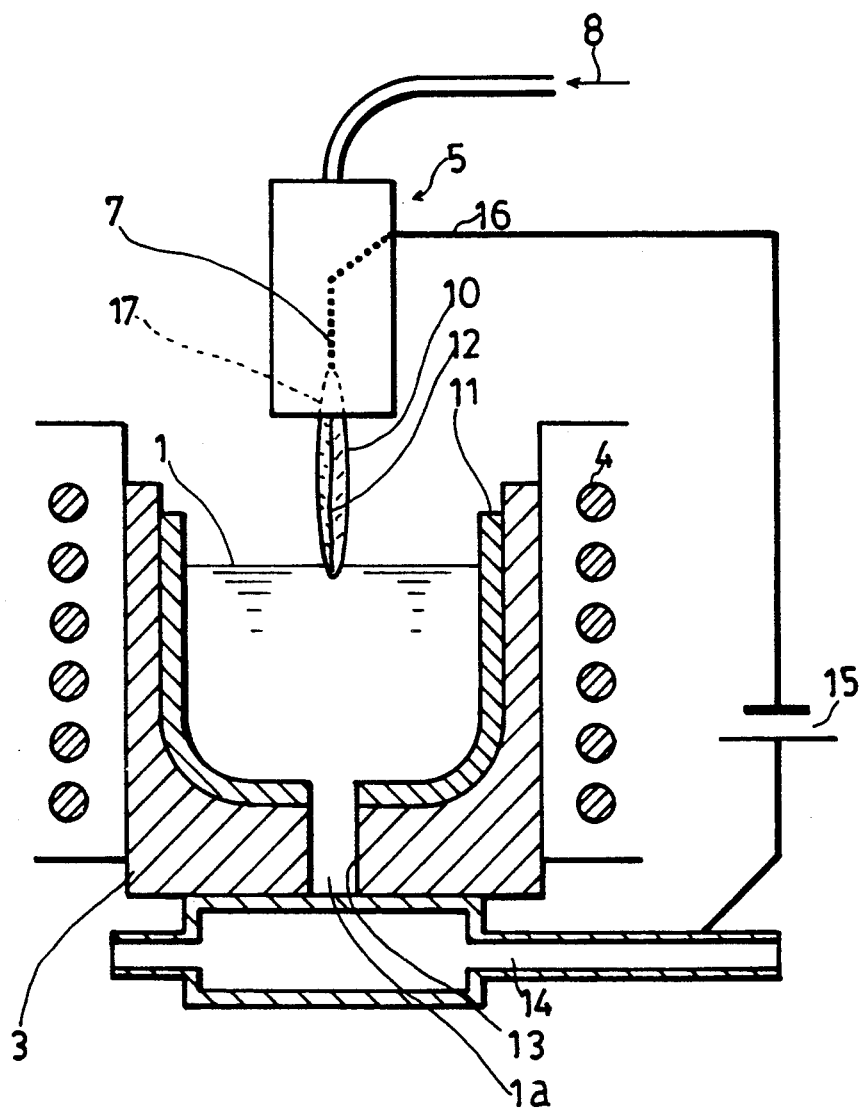
FIG. 4 is a longitudinal sectional view showing an apparatus for purifying silicon which pertains to the second embodiment.

Silicon purification was carried out using an apparatus as shown in FIG. 4 which is a longitudinal sectional view. (Like reference characters designate like or corresponding parts in FIGS. 1 and 4.)

The apparatus is composed of a silica crucible 11 backed by a heat-insulating lining 3, an induction heating coil 4 to melt silicon, a plasma torch 5 which emits a plasma jet 10 and an electron beam 12 toward the surface of molten silicon 1, a water-cooled electrode 14 placed underneath the silica crucible, and an arc power source 15. The silica crucible 11 has a bottom opening 13. Silicon 1a in the bottom opening 13 is kept cooled and solidified, and it permits the electric current to flow to the water-cooled electrode 14. (Water-cooling may be replaced by gas-cooling.) The arc power source 15 is connected to the cathode 7 and the water-cooled electrode 14 by the wiring 16, so that they form a closed circuit through the electron beam 12, the molten silicon 1, and the solidified silicon la. The plasma torch 5 is fed with a plasma gas 8 which is argon or argon mixed with helium and/or hydrogen. The plasma gas is mixed with optional steam, oxygen, and silica powder through an inlet 17.

Raw silicon (500 g) was placed in the silica crucible 11 (80 mm in diameter) having the bottom opening 13 (15 mm in diameter). The silicon was melted at 1430° C. by the induction heating coil 14 under the atmospheric pressure. Toward the surface of the molten silicon was directed for 30 minutes the plasma jet 10 generated by the 30-kW arc plasma torch 5 (fed with argon as the plasma gas at a rate of 15 liters/min) together with the electron beam 12 emitted from the cathode 7. The plasma torch was placed 50 mm above the molten silicon. The results are shown in Table 2, No. 1.

EXAMPLE 10

The same procedure as in Example 9 was repeated, except that the plasma gas was mixed with 5 vol% steam. The results are shown in Table 2, No. 2.

from inexpensive regular grade silicon, high-purity silicon suitable for the production of solar cells. Therefore, the present invention will alleviate the dependence on expensive semiconductor-grade silicon for the production of solar cells and hence greatly contribute to the society through the wide-spread use of solar cells.

TABLE 1

| No. | Conditions | Impurities (ppm) before purification | | Impurities (ppm) after purification | | Loss (%) of silicon during purification | Power (kW) for plasma generation |
|---|---|---|---|---|---|---|---|
| | | Boron | Carbon | Boron | Carbon | | |
| 1 | Argon alone, atmospheric pressure | 17 | 72 | 12 | 18 | 2.0 | 14 |
| 2 | plus 3 vol % steam | 17 | 63 | 3.1 | <10 | 2.1 | 15 |
| 3 | plus 4.5 vol % steam | 17 | 65 | 1.0 | <10 | 3.5 | 15 |
| 4 | plus 3 vol % steam and 0.6 g silica powder/ normal liter | 17 | 70 | 1.1 | <10 | 2.5 | 16 |
| 5 | plus 9 vol % steam, atmospheric pressure | 13 | 65 | 1.0 | <10 | 2.7 | 15 |
| 6 | 0.1 vol% oxygen, atmospheric pressure | 16 | 67 | 8.0 | <10 | 4.5 | 15 |
| 7 | plus 3 vol % steam, $10^{-2}$ atm | 15 | 63 | 4.5 | <10 | 5.0 | 13 |
| | | 15 | 63 | 4.5 | <10 | 5.0 | 13 |
| 8 | plus 0.1 vol % oxygen and flux | 17 | 65 | 5.5 | <10 | 7.0 | 14 |
| 9* | plus 0.1 vol % oxygen, atmospheric pressure | 18 | 62 | 13 | 20 | 25.0 | 13 |

*Comparative Example

TABLE 2

| No. | Conditions | Impurities (ppm) before purification | | Impurities (ppm) after purification | | Loss (%) of silicon during purification | Power (kW) for plasma generation |
|---|---|---|---|---|---|---|---|
| | | Boron | Carbon | Boron | Carbon | | |
| 1 | Argon alone, atmospheric pressure | 18 | 72 | 12 | 16 | 2.5 | 11 |
| 2 | plus 5 vol % steam, atmospheric pressure | 16 | 65 | 5.01 | <10 | 3.2 | 9 |
| 3 | plus 3 vol % steam, $10^{-2}$ atm | 17 | 63 | 4.5 | <10 | 5.1 | 10 |
| 4 | plus 10 vol % steam, atmospheric pressure | 15 | 70 | 1.5 | <10 | 8.5 | 11 |

EXAMPLE 11

The same procedure as in Example 9 was repeated, except that the plasma gas was mixed with 3 vol% steam and the process was carried out under reduced pressure ($10^{-2}$ atm). The results are shown in Table 2, No. 3.

EXAMPLE 12

The same procedure as in Example 9 was repeated, except that the plasma gas was mixed with 10 vol% steam. The results are shown in Table 2, No. 4.

EFFECT OF TE INVENTION

As mentioned above, the present invention provides a method and apparatus for economically producing,

What is claimed is:

1. A method for purifying silicon which comprises directing a plasma jet of an inert gas toward the surface of molten silicon held in a container lined with silica or a silica-based refractory and stirring said molten silicon, said inert gas being mixed with 0.1–10 vol % steam.

2. A method as claimed in claim 1, wherein the inert gas as the plasma gas is mixed with less than 1 g of silica per liter of the inert gas at standard conditions of temperature and pressure.

3. A method as claimed in claim 1, wherein a voltage for plasma generation is applied across the molten silicon and the plasma torch which emits the plasma jet.

* * * * *